United States Patent
Kearney

(10) Patent No.: US 6,776,542 B1
(45) Date of Patent: Aug. 17, 2004

(54) TICKET ISSUING SYSTEM

(76) Inventor: Keith Kearney, 530 Croydon Rd., Elmont, NY (US) 11003

(*) Notice: Subject to any disclaimer, the term of this patent is extended or adjusted under 35 U.S.C. 154(b) by 0 days.

(21) Appl. No.: 10/402,564

(22) Filed: Mar. 28, 2003

(51) Int. Cl.$^7$ .............................. B41J 3/28; B41J 1/60; G06K 9/62

(52) U.S. Cl. ............................. 400/23; 101/66; 101/69; 101/110; 400/88; 400/525; 382/100; 382/105; 382/177; 382/274

(58) Field of Search ........................... 101/66, 110, 69; 400/88, 23, 525; 250/271; 382/105, 177, 274; 235/384

(56) References Cited

U.S. PATENT DOCUMENTS

| | | | | |
|---|---|---|---|---|
| 3,673,416 A | * | 6/1972 | Berler | 250/569 |
| 4,368,979 A | | 1/1983 | Ruell | 356/71 |
| 4,828,406 A | | 5/1989 | Masciatti et al. | 400/23 |
| 4,878,248 A | * | 10/1989 | Shyu et al. | 382/105 |
| 4,970,389 A | | 11/1990 | Danforth et al. | 250/271 |
| 5,021,984 A | * | 6/1991 | Meade et al. | 708/146 |
| 5,370,465 A | * | 12/1994 | Banker | 400/23 |
| 5,425,108 A | | 6/1995 | Hwang et al. | 382/105 |
| 5,489,773 A | * | 2/1996 | Kumar | 235/380 |
| 5,503,483 A | * | 4/1996 | Petteruti et al. | 400/88 |
| 5,504,589 A | * | 4/1996 | Montague et al. | 358/403 |
| 5,514,861 A | * | 5/1996 | Swartz et al. | 235/462.44 |
| 5,591,972 A | * | 1/1997 | Noble et al. | 250/330 |
| 5,734,343 A | * | 3/1998 | Urbish et al. | 340/942 |
| 5,915,032 A | * | 6/1999 | Look | 382/100 |
| 5,979,757 A | * | 11/1999 | Tracy et al. | 235/383 |
| 6,109,525 A | * | 8/2000 | Blomqvist et al. | 235/384 |
| 6,191,705 B1 | * | 2/2001 | Oomen et al. | 235/384 |
| 6,243,447 B1 | * | 6/2001 | Swartz et al. | 379/93.12 |
| 6,412,699 B1 | * | 7/2002 | Russell et al. | 235/472.01 |
| 6,446,865 B1 | * | 9/2002 | Holt et al. | 235/382 |
| 6,473,790 B1 | * | 10/2002 | Tagi | 709/216 |
| 6,513,710 B1 | * | 2/2003 | Haas | 235/380 |
| 6,518,881 B2 | * | 2/2003 | Monroe | 340/539.1 |
| 6,578,766 B1 | * | 6/2003 | Parker et al. | 235/462.01 |
| 6,581,837 B1 | * | 6/2003 | Hattersley | 235/462.44 |
| 6,604,681 B1 | * | 8/2003 | Burke et al. | 235/383 |
| 2002/0036565 A1 | * | 3/2002 | Monroe | 340/425.5 |
| 2003/0066883 A1 | * | 4/2003 | Yu | 235/382 |
| 2003/0114206 A1 | * | 6/2003 | Timothy et al. | 455/575 |
| 2003/0171096 A1 | * | 9/2003 | Ilan et al. | 455/3.06 |

* cited by examiner

*Primary Examiner*—Edward Lefkowitz
*Assistant Examiner*—Wasseem H. Hamdan

(57) ABSTRACT

A ticket issuing system for facilitating processing and printing of citations. The ticket issuing system includes a housing being designed for being held in a hand of a user. An information assembly is positioned in the housing. The information assembly is designed for gathering information about a vehicle and the violation. A printing assembly designed for printing the citation to be issued to the motorist. The printing assembly is operationally coupled to the information assembly whereby the printing assembly gathers information from the information assembly to print the citation.

1 Claim, 3 Drawing Sheets

TICKET ISSUING SYSTEM

BACKGROUND OF THE INVENTION

1. Field of the Invention

The present invention relates to vehicle identification systems and more particularly pertains to a new ticket issuing system for facilitating processing and printing of citations.

2. Description of the Prior Art

The use of vehicle identification systems is known in the prior art. U.S. Pat. No. 4,970,389 describes a system for scanning a specifically constructed windshield of a vehicle to obtain information about the vehicle. Another type of vehicle identification system is U.S. Pat. No. 4,368,979 having a license plate having a hologram comprising encoded information for obtaining information about the vehicle. U.S. Pat. No. 5,425,108 has a identification for a car-plate which allows information about the vehicle to be retrieved whether the vehicle is stopped or in motion. U.S. Pat. No. 4,828,406 has a device for storing information and printing tickets.

SUMMARY OF THE INVENTION

An object of the present invention is to provide a new ticket issuing system that facilitates the gathering of information and the issuance of a citation.

Even still another object of the present invention is to provide a new ticket issuing system that reduces the chance that a law enforcement officer is assaulted by reducing the amount of time the law enforcement officer is present issuing a citation.

To this end, the present invention generally comprises a housing being designed for being held in a hand of a user. An information assembly is positioned in the housing. The information assembly is designed for gathering information about a vehicle and the violation. A printing assembly designed for printing the citation to be issued to the motorist. The printing assembly is operationally coupled to the information assembly whereby the printing assembly gathers information from the information assembly to print the citation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
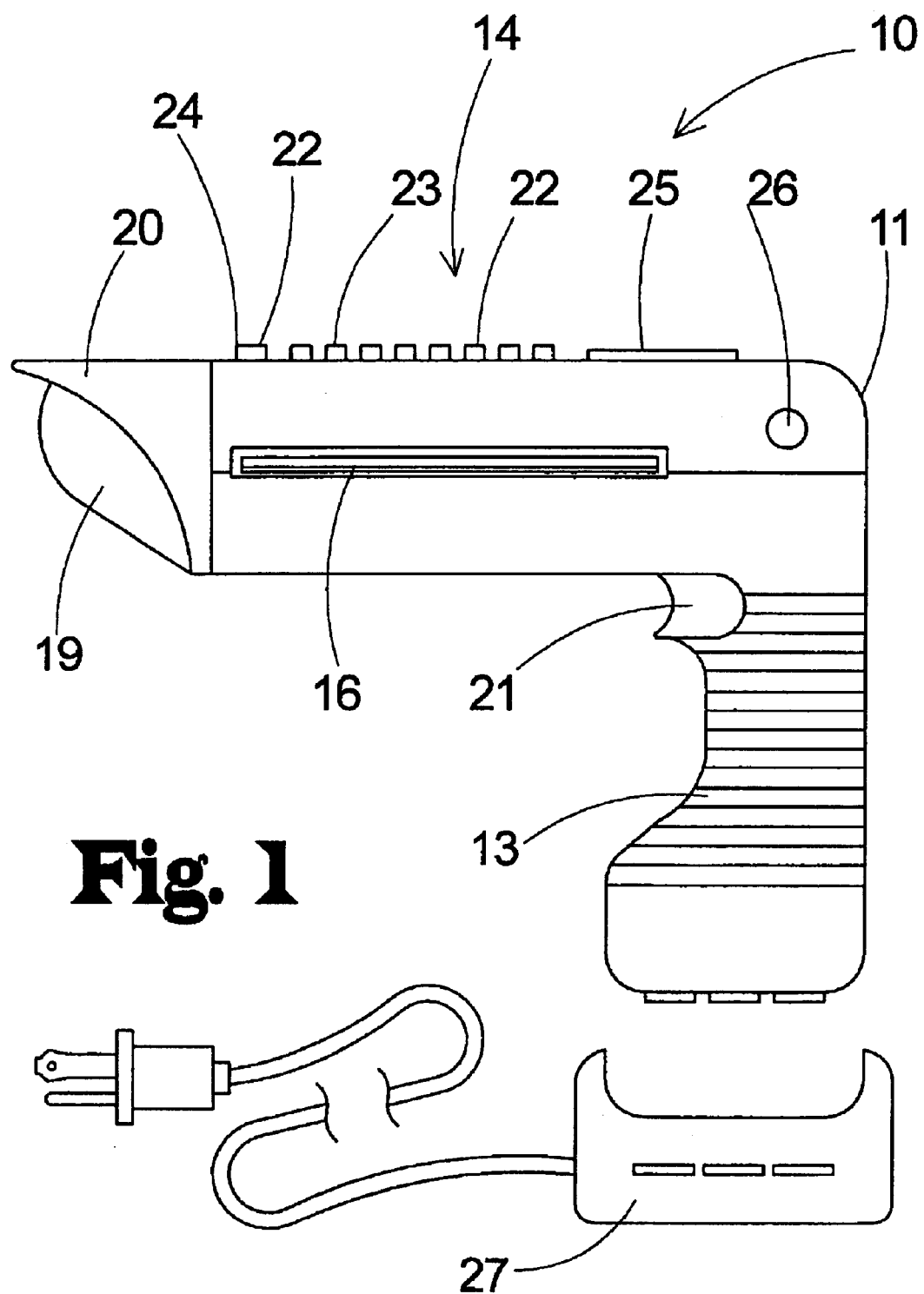
FIG. 1 is a side view of a new ticket issuing system according to the present invention.
Figure 2:
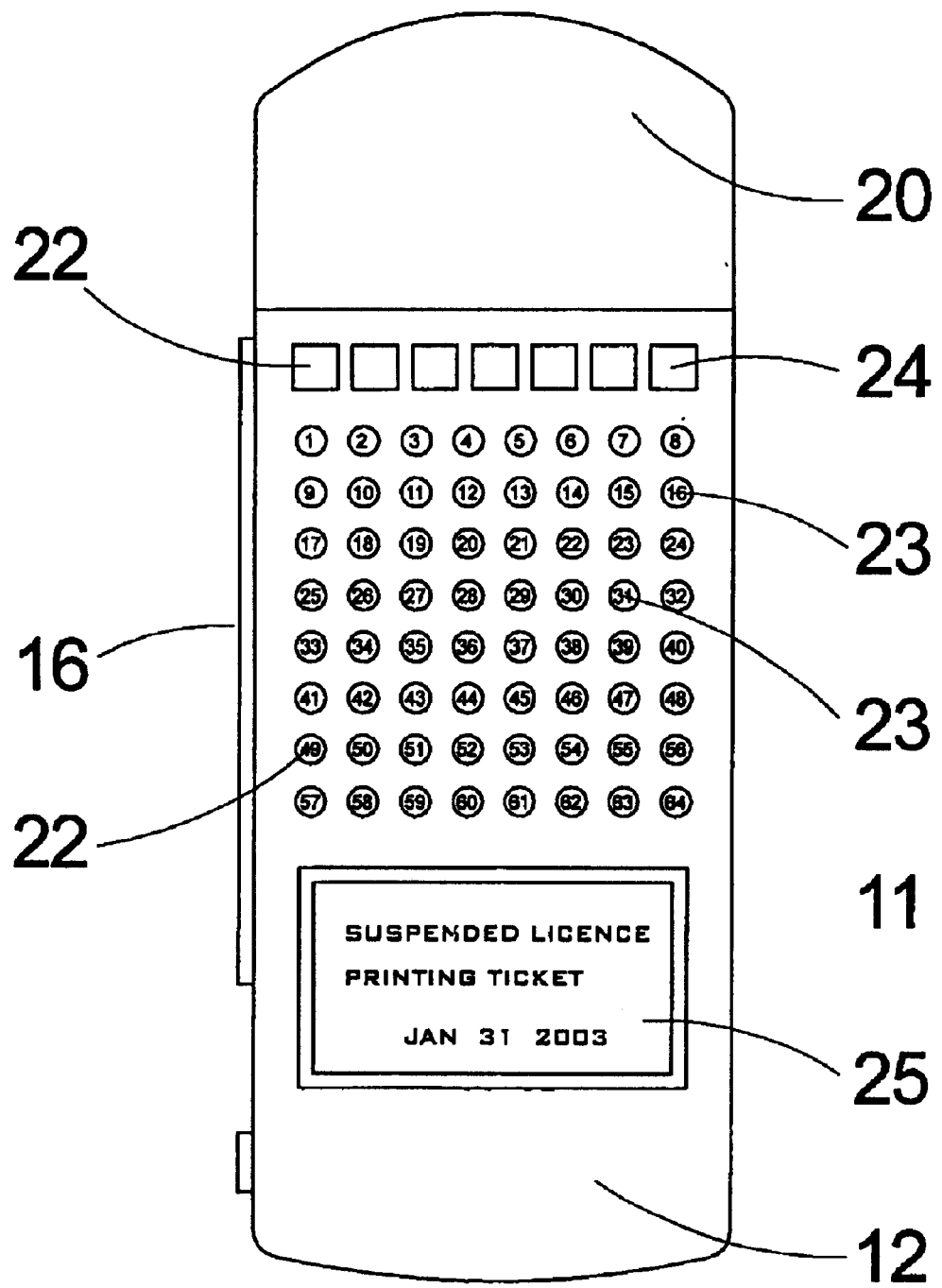
FIG. 2 is a top view of the present invention.
Figure 3:
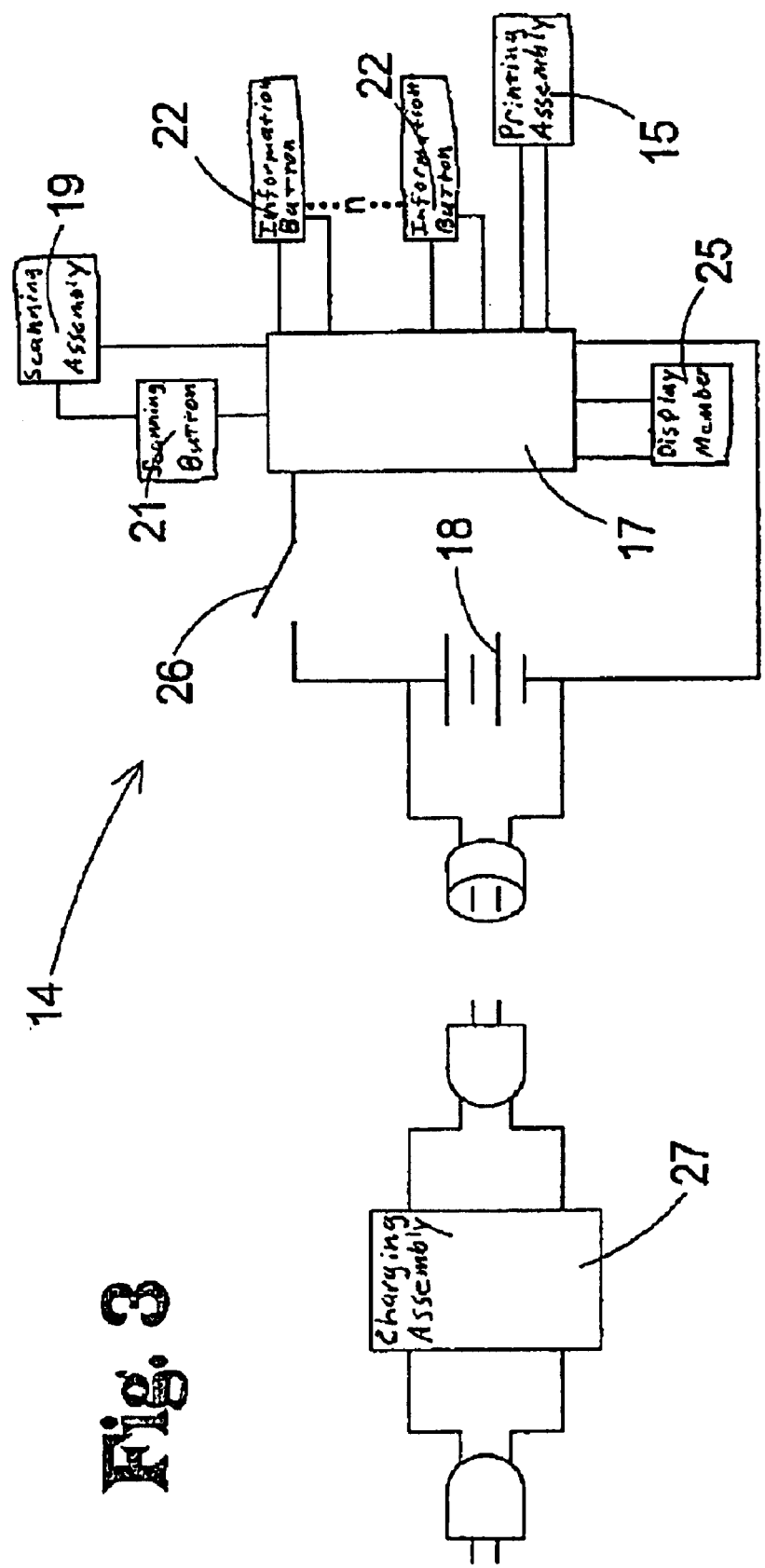
FIG. 3 is a schematic view of the present invention.

With reference now to the drawings, and in particular to FIGS. 1 through 3 thereof, a new ticket issuing system embodying the principles and concepts of the present invention and generally designated by the reference numeral 10 will be described.

As best illustrated in FIGS. 1 through 3, the ticket issuing system 10 generally comprises a housing 11 being designed for being held in a hand of a user. The housing 11 comprises a main portion 12 and a grip portion 13. The grip portion 13 is coupled to the main portion 12 whereby the grip portion 13 extends downwardly from the main portion 12. The grip portion 13 is designed for being gripped by the user to facilitate gathering information.

An information assembly 14 is positioned in the housing 11. The information assembly 14 is designed for gathering information about a vehicle and the violation.

A printing assembly 15 designed for printing the citation to be issued to the motorist. The printing assembly 15 is operationally coupled to the information assembly 14 whereby the printing assembly 15 gathers information from the information assembly 14 to print the citation.

The housing 11 comprises a ticket slot 16. The ticket slot 16 extends into the housing 11 whereby the ticket slot 16 is in communication with the printing assembly 15. The ticket slot 16 is designed for permitting the ticket printed by the printing assembly 15 to be retrieved from the housing 11.

The information assembly 14 comprises a processing assembly 17 and power supply 18. The processing assembly 17 is designed for processing the information gathered by the information assembly 14. The processing assembly 17 is operationally coupled to the printing assembly 15 whereby the processing assembly 17 actuates the printing assembly 15 to print out the citation. The power supply 18 is operationally coupled to the processing assembly 17 whereby the power supply 18 supplies power to the processing assembly 17.

The information assembly 14 comprises a scanning assembly 19 designed for scanning information from the vehicle to gather information relating to the vehicle and the motorist. The scanning assembly 19 is coupled to the housing 11 whereby the scanning assembly 19 is designed for being directed at the vehicle. The scanning assembly 19 is operationally coupled to the processing assembly 17 whereby the scanning assembly 19 transfers the gathered information to the processing assembly 17 to be used in the printing of the citation.

A shield member 20 is coupled to the housing 11. The shield member 20 extends outwardly from the housing 11 whereby the shield member 20 extends beyond the scanning assembly 19 of the information assembly 14. The shield member 20 is designed for inhibiting contact of foreign objects with the scanning assembly 19 to inhibit the scanning assembly 19 being inadvertently damaged from contact with the foreign objects.

The information assembly 14 comprises a scanning button 21. The scanning button 21 is coupled to the housing 11 whereby the scanning button 21 is designed for being actuated by the user. The scanning button 21 is operationally coupled to the scanning assembly 19 whereby the scanning button 21 actuates the scanning assembly 19 to gather information from the vehicle when the scanning button 21 is actuated by the user.

The information assembly 14 comprises a plurality of information buttons 22. The information buttons 22 are coupled to the housing 11 whereby the information buttons 22 are designed for being selectively actuated by the user. Each of the information buttons 22 is operationally coupled to the processing assembly 17 whereby the information buttons 22 are designed for entering information into the processing assembly 17 about the violation when the information buttons 22 are actuated by the user. The information buttons 22 comprise a plurality of violation buttons 23. Each of the violation buttons 23 is designed for entering the violation into the processing assembly 17 for printing of the citation when the violation buttons 23 are actuated by the user. The information buttons 22 comprise a plurality of agency buttons 24. Each of the agency buttons 24 is designed for entering the agency under which the violation was committed into the processing assembly 17 the agency buttons 24 are actuated by the user.

The information assembly 14 comprises a display member 25. The display member 25 is designed for being coupled to the housing 11 whereby the display member 25 is designed for being viewed by the user. The display member 25 is operationally coupled to the processing assembly 17 whereby the display member 25 is designed for displaying the information gathered by the information assembly 14 to be reviewed by the user.

The information assembly 14 comprises a power switch 26. The power switch 26 is coupled to the housing 11 whereby the power switch 26 is designed for being actuated by the user. The power switch 26 is operationally coupled between the power supply 18 and the processing assembly 17 whereby the power switch 26 is for controlling the flow of power from the power supply 18 to the processing assembly 17 when the processing assembly 17 is actuated by the user.

A charging assembly 27 selectively engages the housing 11 whereby the charging assembly 27 is operationally coupled to the power supply 18 when the charging assembly 27 engages the housing 11. The charging assembly 27 is designed for being selectively coupled to a power source whereby the charging assembly 27 is for transferring power from the power source to the power supply 18 to recharge the power supply 18 when the housing 11 engages the charging assembly 27.

In use, the user grips the grip portion 13 of the housing 11 and directs the scanning assembly 19 towards an information collection area, such as a registration, of the vehicle. The user actuates the scanning button 21 to actuate the scanner assembly to gather information from the vehicle. The user then actuates the agency buttons 24 to the correct agency under which the violation falls. The violation buttons 23 are then actuated to enter the violation into the processing assembly 17. The user then reviews the information on the display member 25 to ensure accuracy. The printing means then prints a ticket to be given to the motorist or placed on the vehicle. The housing 11 member can be engaged with the charging assembly 27 to recharge the power supply 18 when the charge on the power supply 18 becomes depleted.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A ticket issuing system for issuing a citation to a motorist for a violation, the ticket issuing system comprising:

a housing being adapted for being held in a hand of a user;

an information assembly being positioned in said housing, said information assembly being adapted for gathering information about a vehicle and the violation;

a printing assembly adapted for printing the citation to be issued to the motorist, said printing assembly being operationally coupled to said information assembly such that said printing assembly gathers information from said information assembly to print the citation;

said information assembly comnprising a processing assembly and power supply, said processing assembly being adapted for processing the information gathered by said information assembly, said processing assembly being operationally coupled to said printing assembly such that said processing assembly actuates said printing assembly to print out the citation, said power supply being operationally coupled to said processing assembly such that said power supply supplies power to said processing assembly;

said information assembly comprising a scanning assembly adapted for scanning information from the vehicle to gather information relating to the vehicle and the motorist, said scanning assembly being coupled to said housing such that said scanning assembly is adapted for being directed at the vehicle, said scanning assembly being operationally coupled to said processing assembly such that said scanning assembly transfers the gathered information to said processing assembly to be used in the printing of the citation;

a shield member being coupled to said housing, said shield member extending outwardly from said housing such that said shield member extends beyond said scanning assembly of said information assembly, said shield member being adapted for inhibiting contact of foreign objects with said scanning assembly to inhibit said scanning assembly being inadvertently damaged from contact with the foreign objects;

said information assembly comprising a scanning button, said scanning button being coupled to said housing such that said scanning button is adapted for being actuated by the user, said scanning button being operationally coupled to said scanning assembly such that said scanning button actuates said scanning assembly to gather information from the vehicle when said scanning button is actuated by the user;

said information assembly comprising a plurality of information buttons, said information buttons being coupled to said housing such that said information buttons are adapted for being selectively actuated by the user, each of said information buttons being operationally coupled to said processing assembly such that said information buttons are adapted for entering information into said processing assembly about the violation when said information buttons are actuated by the user;

said information buttons comprising a plurality of violation buttons, each of said violation buttons being adapted for entering the violation into said processing assembly for printing of the citation when said violation buttons are actuated by the user;

said information buttons comprising a plurality of agency buttons, each of said agency buttons being adapted for entering the agency under which the violation was committed into said processing assembly said agency buttons are actuated by the user;

said information assembly comprising a display member, said display member being adapted for being coupled to said housing such that said display member is adapted for being viewed by the user, said display member being operationally coupled to said processing assembly such that said display member is adapted for displaying the information gathered by said information assembly to be reviewed by the user;

said information assembly comprising a power switch, said power switch being coupled to said housing such that said power switch is adapted for being actuated by the user, said power switch being operationally coupled between said power supply and said processing assembly such that said power switch is for controlling the flow of power from said power supply to said processing assembly when said processing assembly is actuated by the user;

a charging assembly selectively engaging said housing such that said charging assembly is operationally coupled to said power supply when said charging assembly engages said housing, said charging assembly being adapted for being selectively coupled to a power source such that said charging assembly is for transferring power from the power source to said power supply to recharge said power supply when said housing engages said charging assembly;

said housing comprising a main portion and a grip portion, said grip portion being coupled to said main portion such that said grip portion extends downwardly from said main portion, said grip portion being adapted for being gripped by the user to facilitate gathering information; and said housing comprising a ticket slot, said ticket slot extending into said housing such that said ticket slot is in communication with said printing assembly, said ticket slot being adapted for permitting the ticket printed by said printing assembly to be retrieved from said housing.

* * * * *